(12) United States Patent
Brunswig et al.

(10) Patent No.: US 7,685,268 B2
(45) Date of Patent: Mar. 23, 2010

(54) MESSAGE HANDLING FOR USER INTERFACES

(75) Inventors: Frank Brunswig, Heidelberg (DE); Ioannis Grammatikakis, Maxdorf (DE); Kari-Peter Nos, Rauenberg (DE); Guenter Pecht-Seibert, Muhlhausen (DE); Michael Picht, Walldorf (DE); Alexander Rauh, Weinheim (DE); Dinu Pavithran, Bangalore (IN); Holger Schmidt, Sinsheim (DE)

(73) Assignee: SAP AG, Walldorf (DE)

( * ) Notice: Subject to any disclaimer, the term of this patent is extended or adjusted under 35 U.S.C. 154(b) by 305 days.

(21) Appl. No.: 11/811,221

(22) Filed: Jun. 8, 2007

(65) Prior Publication Data

US 2008/0307058 A1 Dec. 11, 2008

(51) Int. Cl.
G06F 15/16 (2006.01)

(52) U.S. Cl. .................................................... 709/223
(58) Field of Classification Search ................ 709/206, 709/223
See application file for complete search history.

(56) References Cited

U.S. PATENT DOCUMENTS

2004/0193635 A1 * 9/2004 Hsu et al. ................... 707/102
2006/0053227 A1 * 3/2006 Ye et al. ..................... 709/230

* cited by examiner

*Primary Examiner*—Quang N. Nguyen
*Assistant Examiner*—Tesfay Yohannes
(74) *Attorney, Agent, or Firm*—Kenyon & Kenyon LLP

(57) ABSTRACT

Generally, systems and methods permit customized delivery of messages to a user depending on the specific requirements of a user interface. A processing layer between a business object and a user interface may determine, for a received message, an appropriate rule for the target user interface. The message rule may be applied, and depending on the rule, the message may be delivered to the user.

4 Claims, 2 Drawing Sheets

MESSAGE HANDLING FOR USER INTERFACES

BACKGROUND

Software applications are often designed in a modular fashion. Such designs permit individual modules to be modified independent of other modules. Modular design also permits reuse of modules for different applications. For example, an internet search engine may be implemented on a server and accessed by various devices, including a desktop web browser, handheld device, or audio browser.

The specific messages communicated to a user through a user interface may impact how user-friendly the user interface is. For example, a casual user that receives a technical message about an error in the system may become confused and think of the user interface as daunting.

Message delivery systems are often tightly coupled to the business objects to which they serve and the user interfaces to which they send messages. Often, the code for these systems is tightly integrated, requiring redesign of the message delivery system when the user interfaces and requirements of the business objects change.

DETAILED DESCRIPTION OF EXAMPLE EMBODIMENTS

Generally, systems and methods permit customized delivery of messages to a user depending on the specific requirements of a user interface. A processing layer between a business object and a user interface may determine, for a received message, an appropriate rule for the target user interface. The message rule may be applied, and depending on the rule, the message may be delivered to the user.

In this way, a message from a business object may be displayed to a user based on the specific requirements of the user interface. For example, a financial application may wish to display results to users in various countries. Each user interface may be specific to the country. A translation engine may translate the text from the input language, English, for example, into the target language for each user interface. In another example embodiment, the user interface may only require that urgent messages be displayed to the user. A message rule may filter out non-urgent messages and forward to the user interface only those messages deemed to be urgent.

Figure 1:
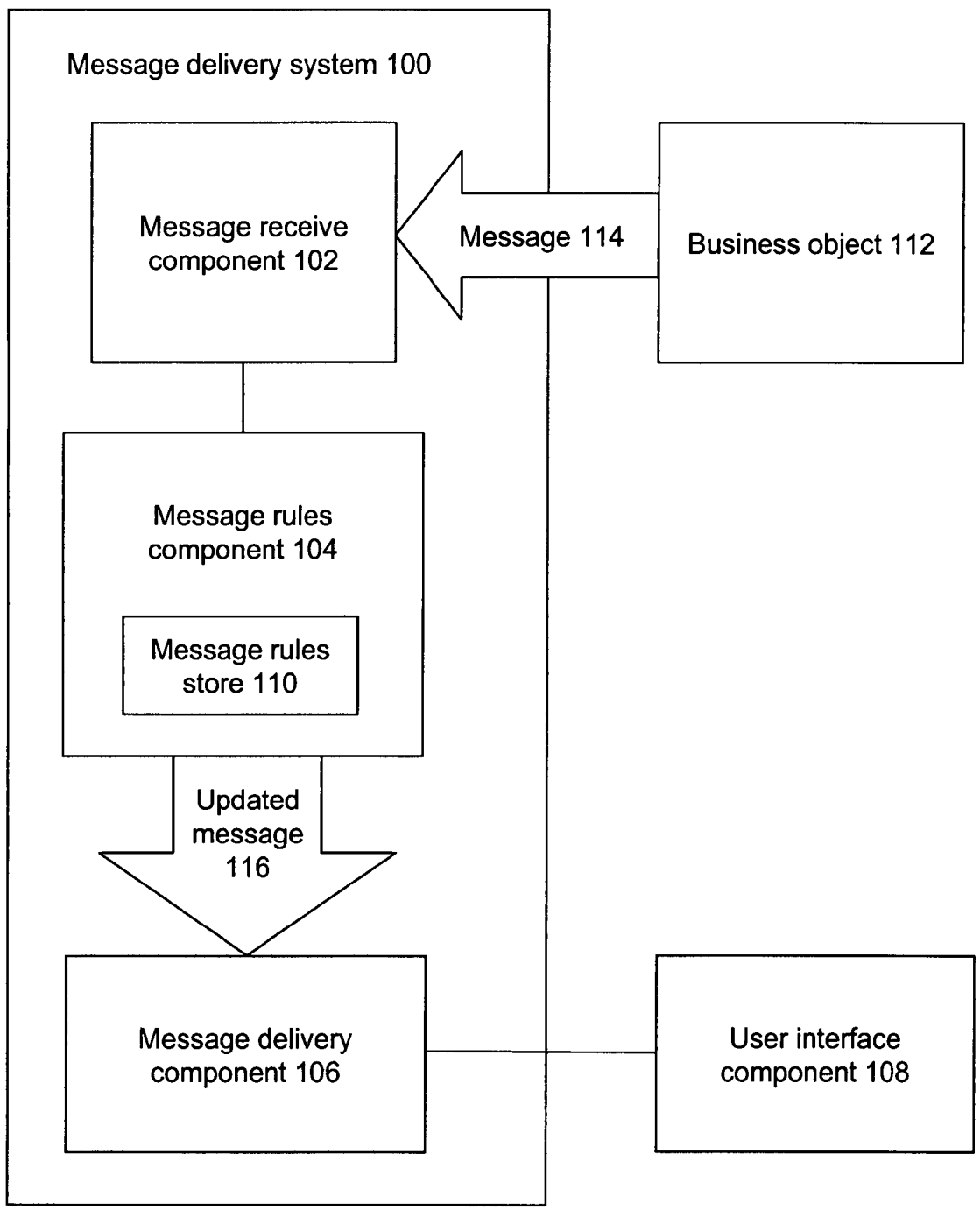
FIG. 1 depicts an example system of an example embodiment of the present invention.

FIG. 1 depicts an example system of an example embodiment of the present invention. The example embodiment may include a business object 112, a message delivery system 100, and a user interface component 108. The business object 112 may generate a message 114 for delivery to the user interface 108. The business object 112 may be in communication with components of the message delivery system 100, which in turn may be in communication with the user interface 108. When the message 114 is delivered from the business object 112 to a message receive component 102 of the message delivery system 100, the message delivery system 100 may apply one or more message rules from a message rule component 104 to the message and, depending on the results of applying the rule, forward an updated message 116 to a message delivery component 106. The message delivery component 106 may then forward the updated message 116 to the user interface 108 so that it may be communicated to a user.

The business object 112 may be any hardware, software, or combinations thereof that generate messages to be communicated to a user. For example, the business object 112 may be a network monitoring server which generates status and warning messages to a network operations center. In another example embodiment, a software object may exist on a database management system and may report to a user the status of database operations, such as success or failure of database store operations. The business object 112 may be integrated as a part of software that includes the message delivery system or may be separated therefrom. For example, the business object may be an object in an object-oriented software package and may communicate with the message delivery system by any appropriate software communications procedure, such as message passing, procedure calls, or sockets communication. In another example embodiment, the business may reside in a system remote to the message delivery system, such as over a local or wide area network. The business object 112 may communicate with the message delivery system by any appropriate remote communication procedure, such as socket communications, remote procedure calls, and other network protocols.

User interface component 108 may receive messages and communicate them to the user. As such, user interface component 108 may communicate with the user in any appropriate medium, for example visual, aural, tactile, or any combinations thereof. The message communicated to the user may depend on the mode of communication. For example, long messages may be displayed in full on displays with significant screen real estate, such as a desktop computer. However, on displays with limited space, such as personal digital assistants and mobile phones, the long messages may need to be shortened. The message delivery system may be aware of the requirements of the specific user interfaces to which the message will be delivered and may alter the message to conform to these requirements. In another example embodiment, messages destined for an audio interface may be converted from text to audio using a text to speech engine.

To conform to the communication requirements of the user interface component 108, the message rules component 104 may include rules to update the message 114, depending on the interface to which the message 114 is to be delivered. Message rules may be stored in a message rules store 110. Message rules may be associated with information identifying the destination user interface. For example, a rule may include a condition that identifies the specific user interface to which the message applies, such as by a user interface identifier. In one example embodiment, a message rule for delivery of messages to a small screen display may generate an updated message, which is the result of truncating messages longer than 24 characters to a maximum of 24 characters. An identifier may be encoded in the message rule, and the logic of the rule may be accordingly designed to update the message for the 24 character or less display. In another example embodiment, more sophisticated rules may include logic to translate the longer messages into shorter messages but maintain the entire gist of the message. For example, the message "The sales order 123.456 has been stored in the system at 2:30:00 EST on May 12, 2007" may be translated to "123.456 stored at 2:30:00." In another example embodiment, the message rules component 104 may include rules to restrict forwarding particular messages to the user interface component 108. For example, a user interface may include audio output. If an incoming message includes a graphic, the message may be ignored by the system.

In another example embodiment, message delivery may depend on the user task to which the user interface is to serve. Depending on the specific task or the specific user, messages may be delivered differently. In an example embodiment, messages may be classified into technical levels, such that the highest technical level represents messages of the greatest technical nature, while lowest level messages are only those messages for casual users of a system. For example, a database management system may generate messages that specify the block and sector information for various operations within the database management system. A casual user may not wish to receive these messages for fear that the user interface may become confusing and may lack user-friendliness; however, a system administrator may wish to receive these messages. The message rules component may include rules for delivery of messages to these two different types of interfaces. In an example embodiment, each rule may indicate to which user interface the messages are to go. Message rules for the system administrator interface may include rules to deliver all messages, including the technical ones, to the user interface. However, message rules for the casual user interface may indicate that only casual messages be delivered to the casual interface. Other messages may be ignored. If no message rule is found for a message, then the message may be delivered to the user interface for fear that messages may become lost in the message delivery system.

The message rules component 104, upon receiving a message to process, may perform a search for a rule or rules to be applied to the message. Messages may be identified in any appropriate manner according to the requirements of the system, for example, by message class identifiers, by business object, or by text of the message itself. The message rules component may perform a search for the appropriate message rule(s) in the message rules store 110 using the message identifying information. Once a message rule has been located, the message rules component 104 may apply the message rule to the message 11 to generate an updated message 116. The message rules component 104 may forward the updated message 116 to the message delivery component 106 for delivery to the user interface component 108 and eventual communication to the user.

In this way, message delivery may be customized depending on the user interface to which the messages are to be delivered. In addition, duplicate user interfaces may be created without requiring the message delivery for each new user interface to be recoded. Furthermore, the message delivery options for a user interface may be updated without requiring the user interface to be recreated and recompiled. Changes may be propagated to each of a number of subscribed user interfaces in real time.

Figure 2:
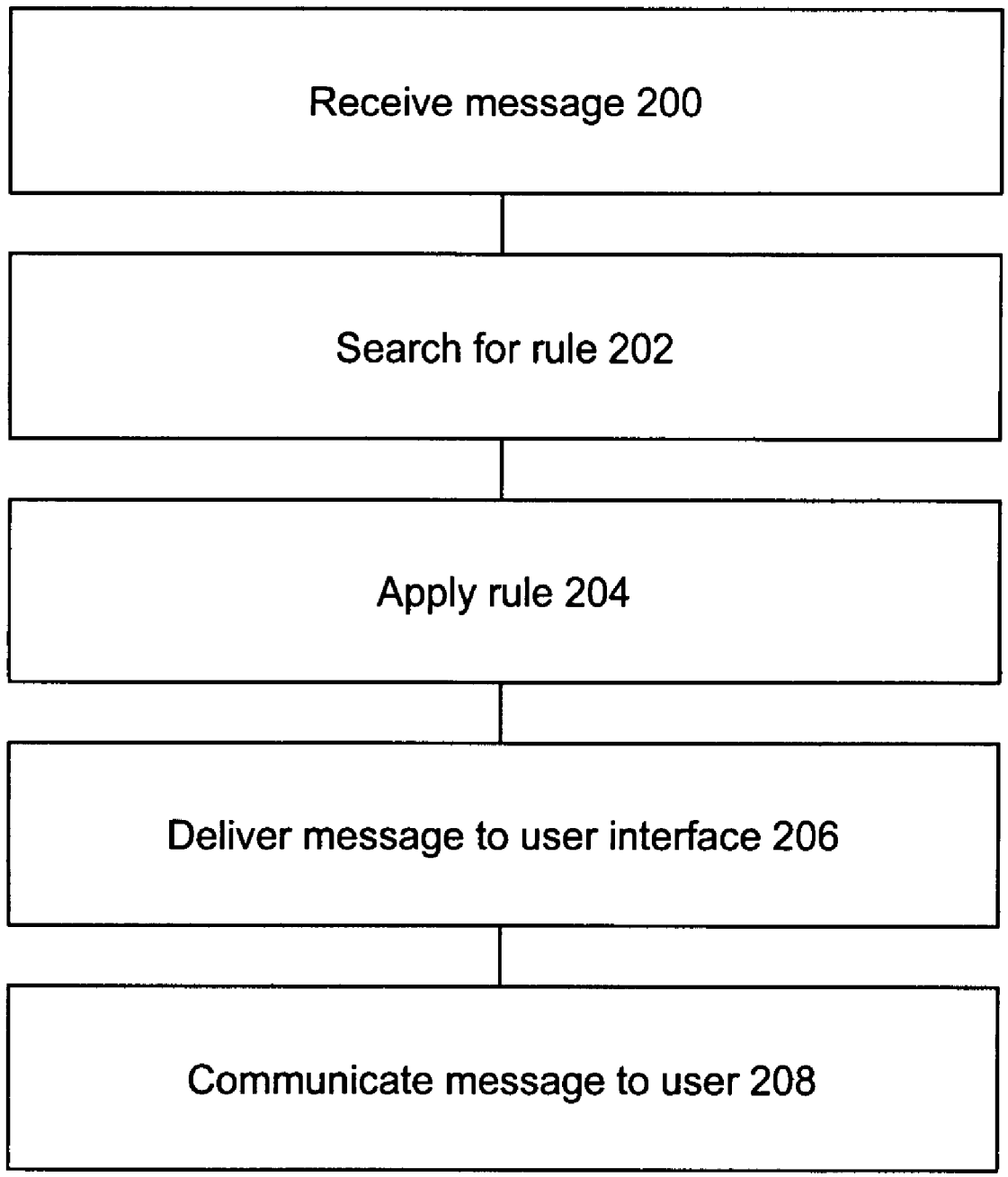
FIG. 2 depicts an example procedure for an example embodiment of the present invention.

FIG. 2 depicts an example procedure for an example embodiment of the present invention. A message may be generated by a business object and delivered to the message delivery system. The message may be received (block 200). The message rules component may search for one or more appropriate message rules (block 202). As described, the message may include identifying information, and the message rules component may perform a search keyed on this identifying information. Once an appropriate message rule is found, the message rule(s) may be applied to the message (block 204) to produce an updated message. The updated message may be delivered to the user interface (block 206) and communicated to the user (block 208).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for delivering a message to a user interface of a plurality of different user interfaces, comprising:
   receiving the message at a message delivery system, the message including an identifier related to a user interface of a plurality of different user interfaces accessible by the message delivery system; determining message identifying information from the message; and
   searching a message rules store based on at least one of the identifier and the message identifying information for the message rule, wherein the message rules store includes a database;
   generating an updated message by applying a message rule to the message based on at least one of the identifier and identifying information in the message, wherein the rule is specific to the user interface; and
   delivering the updated message updated according to the applied rule to the identified user interface; and
   communicating the message to the user.

2. An article of manufacture comprising a computer-readable medium having stored thereon instructions configured to be executed by a processor, the instructions which, when executed by the processor, cause the processor to perform a method for delivering a message to a user interface, comprising:
   receiving the message at a message delivery system, the message including an identifier related to a user interface from a plurality of different user interfaces accessible by the message delivery system;
   generating an updated message by applying a message rule to the message based on the identifier in the message, wherein the rule is specific to the user interface; and
   delivering the updated message updated according to the applied rule to the identified user interface.

3. A system for delivering a message to a user interface, comprising:
   a message receive component configured to receive a message the message including an identifier related to a user interface of a plurality of different user interfaces accessible by the system;
   a message rules store configured to store one or more message rules;
   a rule search component configured to search based on the identifier for the message rule within the message rules store;
   a message rule component configured to generate an updated message by apply a message rule to the message based on the identifier in the message, wherein the rule is specific to the user interface; and
   a message delivery component configured to deliver the updated message updated according to the applied rule to the identified user interface.

4. A method for delivering a message by a message delivery system to a user interface of a message recipient, comprising:
   receiving the message at the message delivery system, the message containing information for presentation via the user interface to the message recipient, information associated with the user interface of the message recipient, message class identifiers, and information associated with a sending business object, which is a business object that sent the message;
   identifying the message using information contained within the message, wherein the message is identified based on text in the message;

searching, by a message rules component of the message delivery system, a message rules store using the message identifying information;

applying a message rule found in the search of the message rules store to the message;

generating an updated message based on application of the message rule by truncating the message; and delivering the updated message to the user interface of the message recipient.

* * * * *